United States Patent
Jain et al.

(10) Patent No.: US 8,903,175 B2
(45) Date of Patent: Dec. 2, 2014

(54) SYSTEM AND METHOD FOR SCRIPT AND ORIENTATION DETECTION OF IMAGES

(75) Inventors: Chirag Jain, Karnataka (IN); Srinidhi Kadagattur, Karnataka (IN); Yifeng Wu, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 484 days.

(21) Appl. No.: 13/219,751

(22) Filed: Aug. 29, 2011

(65) Prior Publication Data

US 2013/0051681 A1    Feb. 28, 2013

(51) Int. Cl.
    *G06K 9/00*         (2006.01)
    *G06K 9/32*         (2006.01)
    *G06K 9/68*         (2006.01)

(52) U.S. Cl.
    CPC ........ *G06K 9/3208* (2013.01); *G06K 2209/013* (2013.01); *G06K 2209/011* (2013.01); *G06K 9/6821* (2013.01)
    USPC .......................................... 382/193; 382/198

(58) Field of Classification Search
None
See application file for complete search history.

(56) References Cited

U.S. PATENT DOCUMENTS

| | | | |
|---|---|---|---|
| 7,020,338 B1 * | 3/2006 | Cumbee ........................ | 382/230 |
| 7,392,473 B2 | 6/2008 | Meunier | |
| 8,509,537 B2 * | 8/2013 | Perronnin et al. ............ | 382/186 |
| 8,712,188 B2 | 4/2014 | Roy et al. | |
| 2009/0028435 A1 | 1/2009 | Wu et al. | |
| 2011/0249897 A1 * | 10/2011 | Chaki et al. ................... | 382/177 |
| 2013/0051681 A1 | 2/2013 | Jain et al. | |
| 2013/0194448 A1 * | 8/2013 | Baheti et al. ................ | 348/222.1 |
| 2013/0195376 A1 * | 8/2013 | Baheti et al. .................. | 382/289 |
| 2013/0266176 A1 * | 10/2013 | Jain et al. ..................... | 382/103 |

OTHER PUBLICATIONS

Chen et al. (Jul. 2011) "A method for detecting document orientation by using SVM classifier." Proc. 2011 IEEE Int'l Conf. on Multimedia Technology, pp. 47-50.*
Deng et al. (2012) "A method for detecting document orientation by using naïve Bayes classifier." Proc. 2012 IEEE Int'l Conf. on Industrial Control and Electronics Engineering, pp. 429-432.*
Ghosh et al. (Sep. 2011) "Composite script identification and orientation detection for Indian text images." Proc. 2011 IEEE Int'l Conf. on Document Analysis and Recognition, pp. 294-298.*
Guo et al. (Dec. 2011) "A revised feature extraction method for detecting text page up/down orientation." Proc. 2011 IEEE Int'l Conf. on Applied Superconductivity and Electromagnetic devices, pp. 105-108.*

(Continued)

*Primary Examiner* — Barry Drennan
(74) *Attorney, Agent, or Firm* — Global IP Services; Prakash Nama

(57) ABSTRACT

A system and method for script and orientation detection of images are disclosed. In one example, textual content in the image is extracted. Further, a vertical component run (VCR) and horizontal component run (HCR) are obtained by vectorizing each connected component in the extracted textual content. Furthermore, a concatenated vertical document vectors (VDV) and a horizontal document vector (HDV) are computed. In addition, a substantially matching script and orientation is obtained by comparing the computed concatenated VDV and HDV of the image with reference VDV and HDV associated with each script and orientation, respectively. Also, the substantially matching script and orientation are declared as the script and orientation of the image, if the computed concatenated VDV and HDV of the image substantially match with the reference VDV and HDV of the matching script and orientation, respectively.

15 Claims, 9 Drawing Sheets

(56) References Cited

OTHER PUBLICATIONS

Lu et al. (Oct. 2006) "Automatic document orientation detection and categorization through document vectorization." Proc. 14$^{th}$ ACM Int'l Conf. on Multimedia, pp. 113-116.*

Park et al. (Sep. 1999) "Efficient word segmentation driven by unconstrained handwritten phrase recognition." Proc. 1999 IEEE Int'l Conf. on Document Analysis and Recognition, pp. 605-608.*

Unnikrishnan et al. (Jul. 2009) "Combined script and page orientation estimation using the Tesseract OCR engine." Proc. 2009 ACM Int'l Workshop on Multilingual OCR, Article No. 6.*

Shijian Lu; Chew Lim Tan; Automatic Detection of Document Script and Orientation; National University of Singapore; Publication Date: Sep. 23-26, 2007; vol. 1; on pp. 237-241.

Ranjith Unnikrishnan; Ray Smith; Combined Script and Page Orientation Estimation Using the Tesseract OCR Engine; Google Inc., publication date: Oct. 23-27, 2006.

Asthana, et al., "Handwritten Multiscript Numeral Recognition Using Artificial Neural Networks," International Journal of Soft Computing and Engineering (IJSCE), Mar. 2011, vol. 1, Issue 1. 5 pages.

Shabana Sheikh, "Arabic—URDU Script Recognition Through Mouse: An Implementation Using Artificial Neural Network", 2010 Seventh International Conference on Information Technology, 4 pages.

H.B. Aradhye, "A Generic Method for Determining Up/Down Orientation of Text in Roman and Non-Roman Scripts", ICDAR, 2005.

Robert S. Caprari, "Algorithm for Text Page Up/Down Orientation Determination", Pattern Recognition Letters 21, 2000, pp. 311-317.

D. Bloomberg, et al, "Measuring Document Image Skew and Orientation", SPIE 2422, pp. 302-316, 1995.

D.S. Le, et al., "Automated Page Orientation and Skew Angle Detection for Binary Document Images", Pattern Recognition Letters, 1994.

Yves Rangoni, et al., "Recognition-Driven Page Orientation Detection", International Conference on Image Processing, Nov 2009.

Lu Shijian, et al., "Script and Language Identification in Noisy and Degraded Document Images", IEEE Transaction on Pattern Analysis and Machine Intelligence, vol. 30, No. 1, Jan. 2008.

N. Otsu, "A Threshold Selection Method From Gray-Level Histogram", IEEE Trans. Systems, Man, Cybernetics, vol. 19, No. 1, pp. 62-66, 1978.

C.C. Fung, et al., "Comparing the Performance of Different Neural Networks Architectures for the Prediction of Mineral Prospectively", Machine Learning and Cybernetics, 2005. Proceedings of 2005 International Conference on, 2005, pp. 394-398.

* cited by examiner

| SCRIPT | CHINESE | KOREAN | JAPANESE | HINDI | ENGLISH | OVERALL |
|---|---|---|---|---|---|---|
| NUMBER OF IMAGES | 400 | 406 | 406 | 200 | 200 | 1612 |
| SCRIPT DETECTION ACCURACY | 94% | 98% | 91% | 99% | 95% | 95% |
| ORIENTATION DETECTION ACCURACY | 97% | 97% | 85% | 99% | 97% | 94% |

SYSTEM AND METHOD FOR SCRIPT AND ORIENTATION DETECTION OF IMAGES

BACKGROUND

With increase in the usage of soft version of images, there has been a need for identifying script and their orientations. Currently, manual checks are performed to categorize the images based on scripts and to correct orientation of the images. However, the manual process can be very time consuming and tedious and may not be cost effective during bulk scanning.

Further, rapid growth in digital libraries has necessitated the need for automated systems for identifying script and their orientations in the images. Furthermore, such automated processing may be required before performing optical character recognition (OCR) analysis.

Existing automated techniques for script and orientation detection of the images are not robust enough to accurately detect the script and orientation and/or are highly computationally intensive.

BRIEF DESCRIPTION OF THE DRAWINGS

Examples of the invention will now be described in detail with reference to the accompanying drawings, in which.

The drawings described herein are for illustration purposes only and are not intended to limit the scope of the present disclosure in any way.

DETAILED DESCRIPTION

A system and method for script and orientation detection of images are disclosed. In the following detailed description of the examples of the present subject matter, reference is made to the accompanying drawings that form a part hereof, and in which are shown by way of illustration specific examples in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

Figure 1:
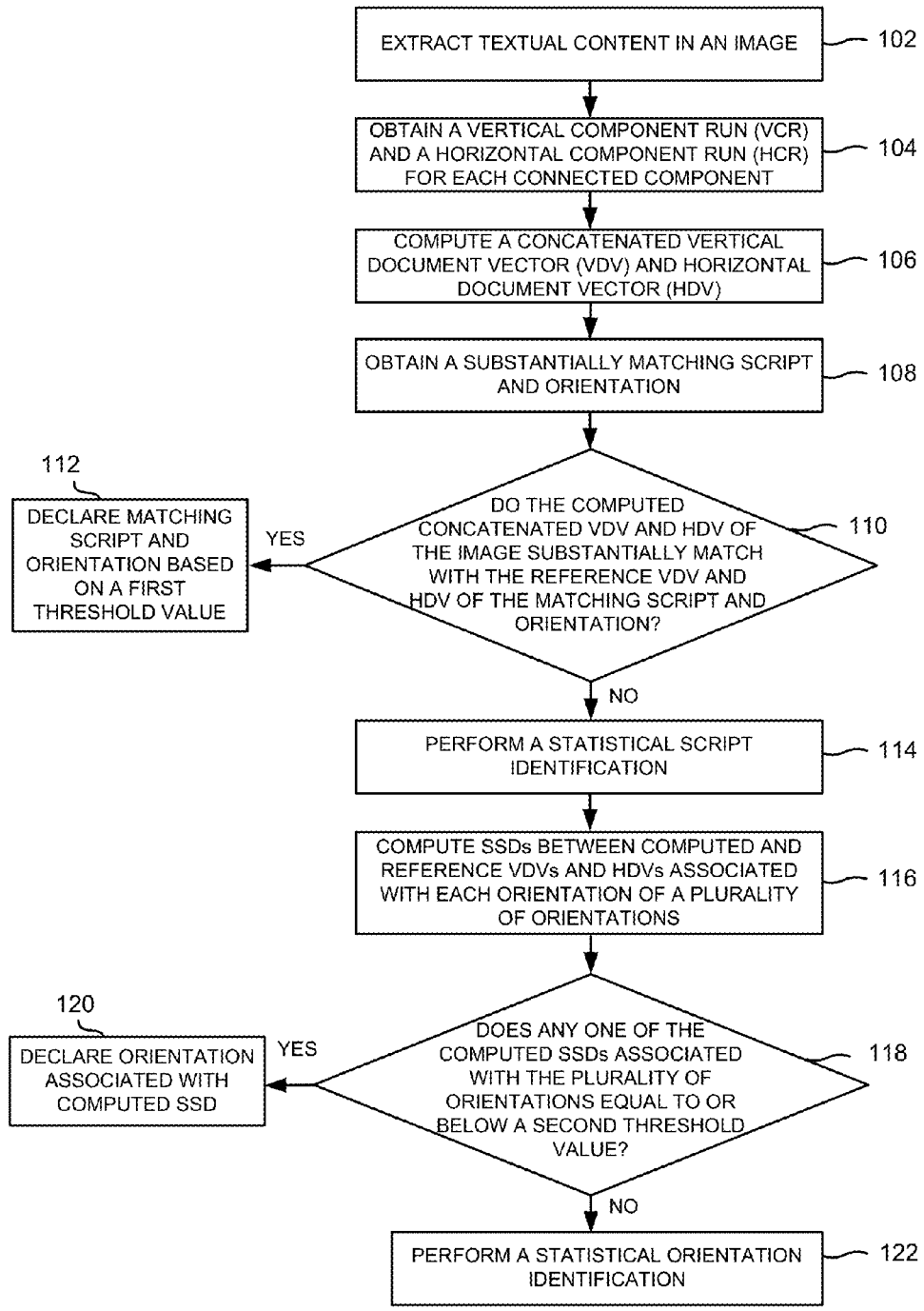
FIG. 1 illustrates an example flow diagram of a method for script and orientation detection of images.

FIG. 1 illustrates an example flow diagram 100 of a method for script and orientation detection of images. The image includes a captured and/or scanned image. For example, the captured and/or scanned image is a document image. Further, the captured and/or scanned image includes textual content. For example, the captured and/or scanned image can also include graphics. At block 102, textual content in the image is extracted. For extracting the textual content, a gray level/colored image is obtained by capturing the image using a camera or scanner. Further, a binarized image is obtained from the gray level/colored image. Furthermore, the binarized image is dilated to obtain a dilated image. The dilation is performed on the binarized image to join disjoint parts of characters in the binarized image. In addition, the textual content is identified and extracted by performing a connected component analysis (CCA) and a resolution based thresholding on the dilated image. In one example implementation, the CCA scans the image and groups pixels in the image into components (i.e., connected components) based on pixel connectivity. The connected component is a connected pixel region in the image. The connected pixel region includes regions of adjacent pixels which share some specific features in the image. This is explained below in more detail with reference to FIGS. 2A-C.

At block 104, a vertical component run (VCR) and horizontal component run (HCR) are obtained by vectorizing each connected component of a plurality of connected components in the extracted textual content in the image. This is explained below in more detail with reference to FIGS. 3 and 4. At block 106, a concatenated vertical document vector (VDV) and horizontal document vector (HDV) are computed by averaging the obtained VCR and HCR for each of the connected components in the image. In context, the concatenated VDV and HDV are computed by averaging and normalizing the obtained VCRs and HCRs of the plurality of connected components in the image.

At block 108, a substantially matching script and orientation are obtained by comparing the computed concatenated VDV and HDV of the image with reference VDV and HDV associated with each script and orientation, respectively. The reference VDV and HDV for each script and orientation are generated by averaging the VDVs and HDVs obtained from a plurality of images associated with each script and orientation. This is explained below in more detail with reference to FIGS. 5A-B. For example, the substantially matching script and orientation are obtained by computing sum of squared differences (SSDs) between the computed and reference VDVs and HDVs associated with each script and orientation. Further, a minimum SSD from the computed SSDs is obtained. Furthermore, the substantially matching script and orientation associated with the obtained minimum SSD that is less than or equal to a first threshold value are obtained, respectively.

At block 110, a check is made to determine whether the computed concatenated VDV and HDV of the image substantially matches with the reference VDV and HDV of the matching script and orientation. If the computed concatenated VDV and HDV of the image substantially matches with the reference VDV and HDV of the matching script and orientation, the method goes to block 112, and declares the matching script and orientation as the script and orientation of the image. If the computed concatenated VDV and HDV of the image does not substantially matches with the reference VDV and HDV of the matching script and orientation, the method goes to block 114, and performs statistical script identification to identify the script of the image.

At block 116, SSDs between the computed and reference VDVs and HDVs associated with each orientation of a plurality of orientations are computed. For example, the plurality of orientations includes image orientation angles selected from the group consisting of 0 degree, 90 degree, 180 degree, and 270 degree. At block 118, a check is made to determine whether any one of the computed SSDs associated with the plurality of orientations is equal to or below a second threshold value. If any one of the computed SSDs associated with the plurality of orientations is equal to or below the second threshold value, the method goes to block 120, and declares the orientation associated with the computed SSD that is equal to or below the second threshold value as the orientation of the image. If any one of the computed SSDs associated with the plurality of orientations is not equal to or below the second threshold value, the method goes to block 122, and performs statistical orientation identification to identify the orientation of the image.

Figure 2A:
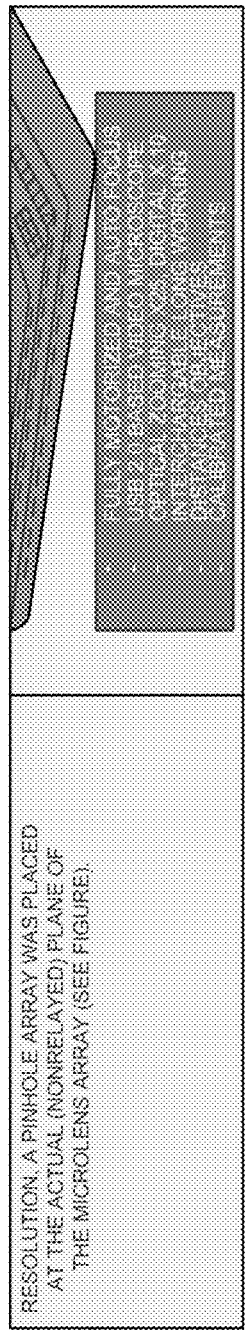
FIGS. 2A-C are example block diagrams illustrating the pre-processing step of FIG. 1 including textual content extraction from the image.

Referring now to FIG. 2A, an example block diagram 200A illustrates the pre-processing step of FIG. 1, including textual content extraction from the image. Particularly, the block diagram 200A illustrates the pre-processing step of obtaining a gray level/colored image from the image. In one example implementation, the image is captured using a camera and/or scanner to obtain the gray level/colored image, shown in FIG. 2A. The gray level/colored image includes text selected from the group consisting of reverse text (i.e., light text on dark background), graphics, and noise. As shown in FIG. 2A, the gray level/colored image includes two different foregrounds and backgrounds and right half of the gray level/colored image includes reverse text.

Figure 2B:
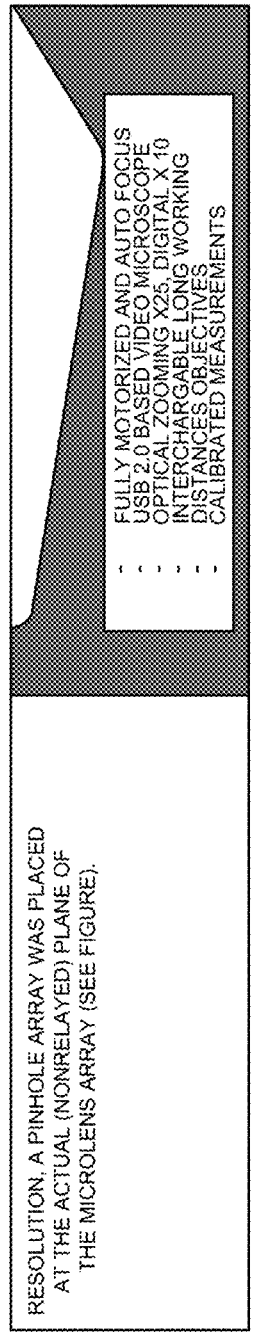

Referring now to FIG. 2B, an example block diagram 200B illustrates the pre-processing step of FIG. 1 including textual content extraction from the image. Particularly, the block diagram 200B illustrates the preprocessing step of obtaining a binarized image from the gray level/colored image, shown in FIG. 2A. For example, a binarization algorithm, such as an Otsu's algorithm is applied to the gray level/colored image, shown in FIG. 2A, to obtain the binarized image. The Otsu's algorithm for binarization chooses a threshold value which maximizes variance of intensities of foreground and background. In one example implementation, the gray level/colored image is divided into a plurality of sub-images. Further, the Otsu's algorithm is applied locally to identify the background and foreground. Furthermore, the background and foreground intensities are detected by assuming that a considerably larger portion of the gray level/colored image is occupied by the background than the foreground. In addition, the plurality of sub-images with reverse text (i.e., light text on dark background) are then inverted to obtain the binarized image, shown in FIG. 2B, with white background and black text.

Figure 2C:
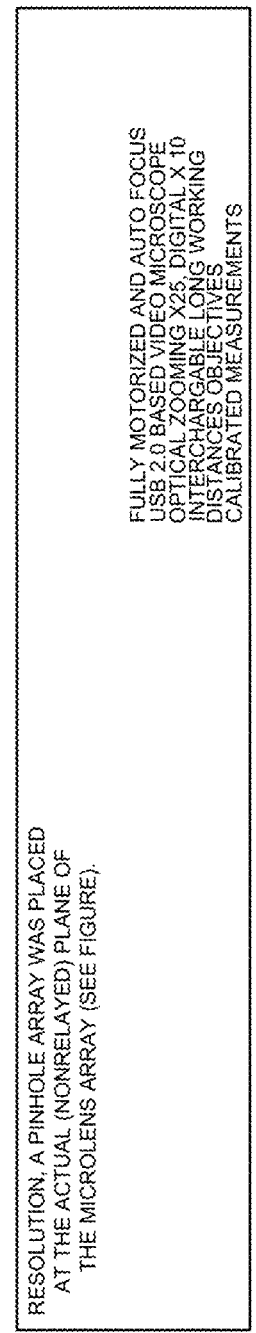

Referring now to FIG. 2C, an example block diagram 200C illustrates the pre-processing step of FIG. 1 including textual content extraction from the image. Particularly, the block diagram 200C illustrates identifying and extracting textual content in the obtained binarized image. In one example implementation, the obtained binarized image, shown in FIG. 2B, is dilated to obtain the dilated image. The dilation is performed on the binarized image to join disjoint parts of characters and to enhance shape of the characters in the binarized image. For example, the characters in Asian languages are composed of one or more parts. The dilation is performed to join the disjoint parts of the characters and to enhance the shape of the characters. In this example, a 3×3 pixel dilation window is used to join the disjoint parts of the characters.

Further, the CCA and resolution based thresholding are performed on the dilated image to identify and extract the textual content, shown in FIG. 2C. For example, the dilated image is segmented by performing the CCA. Further, the resolution based thresholding is performed to obtain textual content by discarding the noise and graphics.

Figure 3:
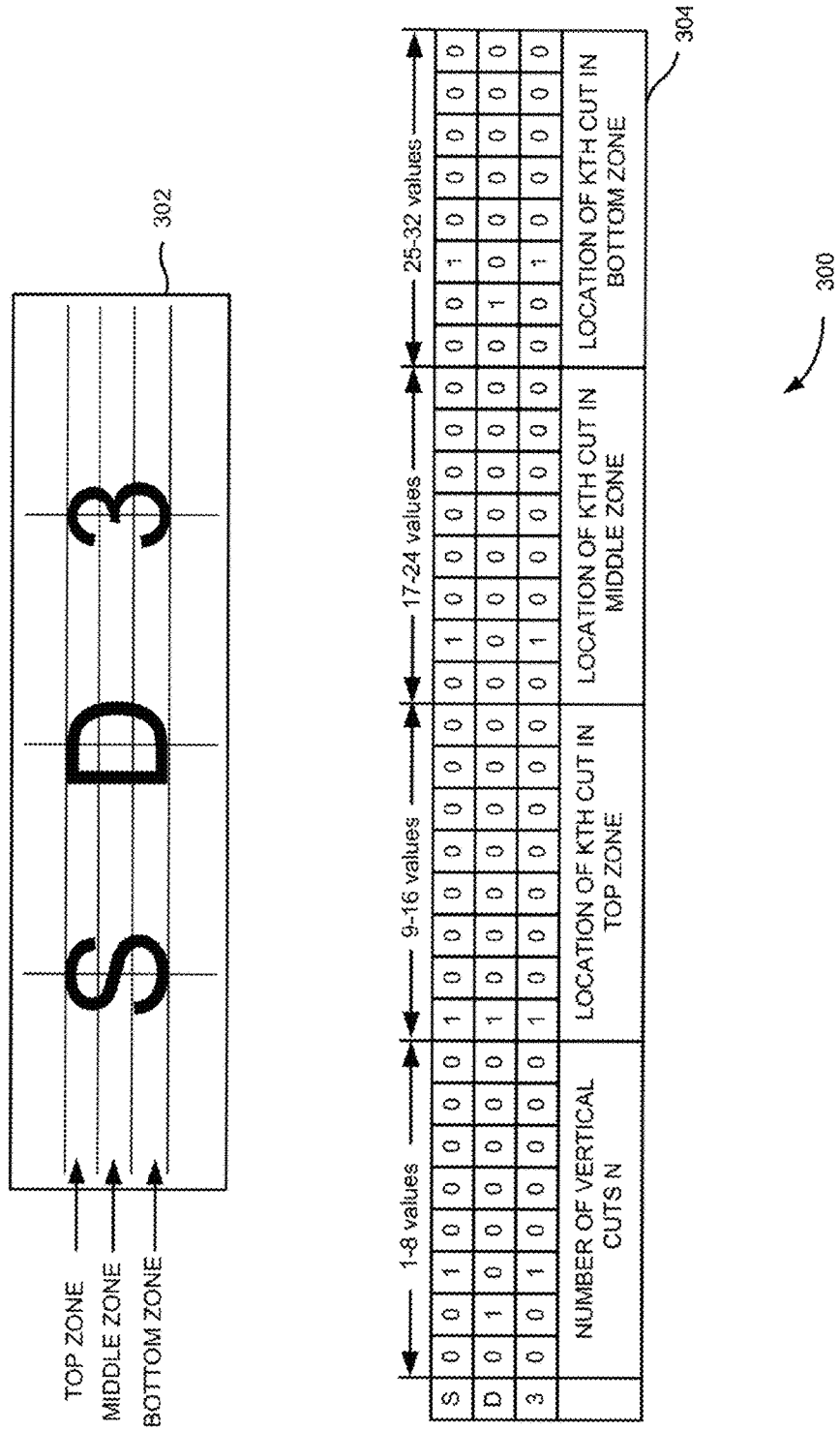
FIG. 3 illustrates an example block diagram of forming a 32-value vector of a vertical component run (VCR) for three exemplary connected components.

Referring now to FIG. 3, an example block diagram 300 illustrates forming a 32-value vector of a VCR 304 for three exemplary connected components 302. As shown in FIG. 3, each of the three connected components 302 is divided into three zones (i.e., top zone, middle zone, and bottom zone). Further, the VCR 304 is generated for each of the three connected components 302 by traversing from top to bottom through the centroid of each of the three connected components 302. The 32-value vector of the VCR 304 is constructed for each of the three connected components 302 based on number and locations of vertical cuts in the three zones. Furthermore, a VDV is computed by averaging and normalizing the obtained VCR for each of the connected components in the image.

For example, position of 1 in 1-8 values of the 32-value vector of the VCR of the connected component represents number of vertical cuts in the connected component. Further, the position of 1's in 9-16 values of the 32-value vector of the VCR of the connected component represent location of vertical cuts lying in the top zone of the connected component. Furthermore, the position of 1's in 17-24 values of the 32-value vector of the VCR of the connected component represent location of vertical cuts lying in the middle zone of the connected component. In addition, the position of 1's in 25-32 values of the 32-value vector of the VCR of the connected component represent location of vertical cuts lying in the bottom zone of the connected component.

Figure 4:
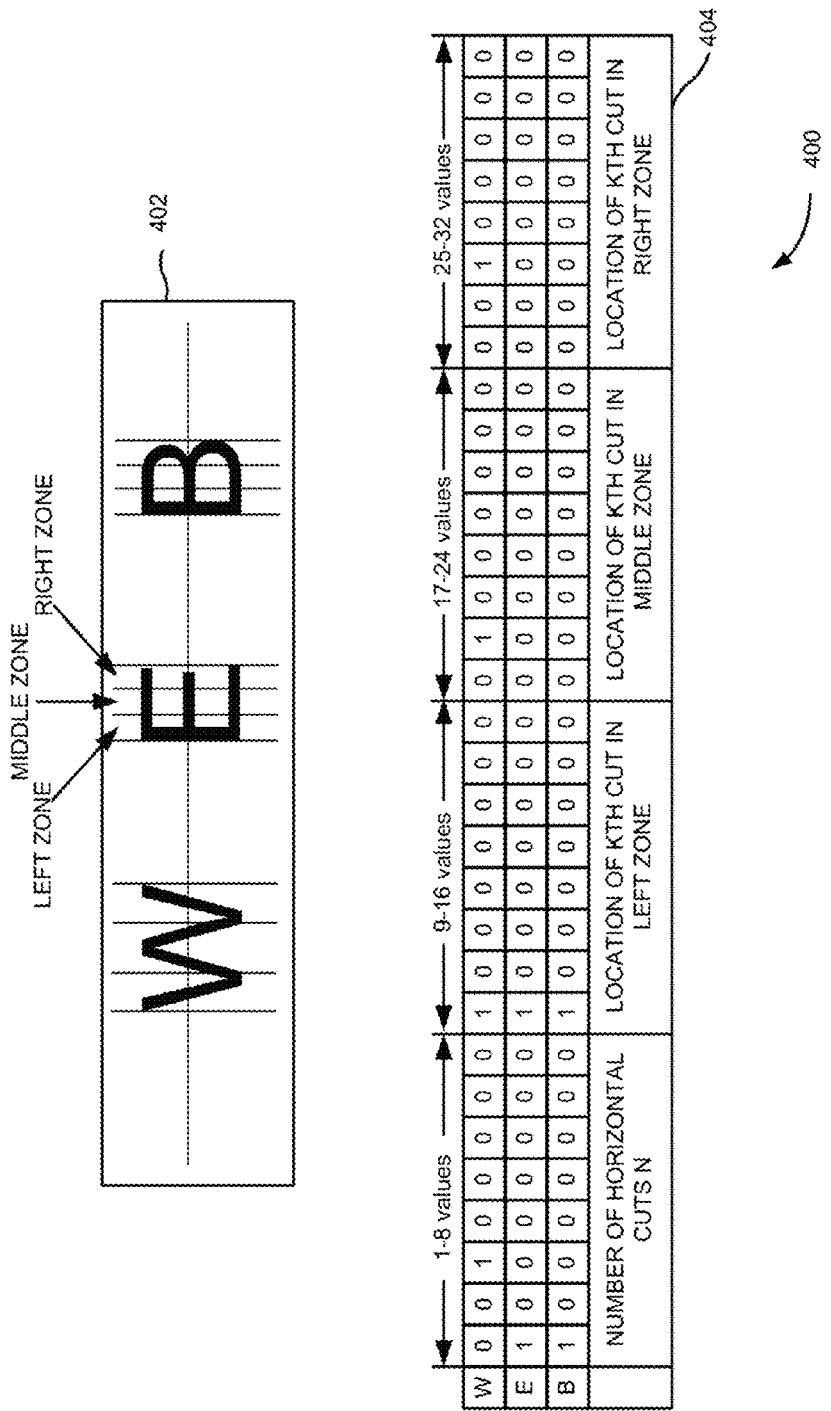
FIG. 4 illustrates an example block diagram of forming a 32-value vector of a horizontal component run (HCR) for three exemplary connected components.

Referring now to FIG. 4, an example block diagram 400 illustrates forming a 32-value vector of a HCR 404 for three exemplary connected components 402. As shown in FIG. 4, each of the three connected components 402 is divided into three zones (i.e., left zone, middle zone, and right zone). Further, the HCR 404 is generated for each of the three connected components 402 by traversing from left to right through the centroid of each of the three connected components 402. The 32-value vector of the HCR 404 is constructed for each of the three connected components 402 based on number and locations of horizontal cuts in the three zones. Furthermore, a HDV is computed by averaging and normalizing the obtained HCR for each of the connected components in the image.

For example, position of 1 in 1-8 values of the 32-value vector of the HCR of the connected component represents number of horizontal cuts in the connected component. Further, the position of 1's in 9-16 values of the 32-value vector of the HCR of the connected component represent location of horizontal cuts lying in the left zone of the connected component. Furthermore, the position of 1's in 17-24 values of the 32-value vector of the HCR of the connected component represent location of horizontal cuts lying in the middle zone of the connected component. In addition, the position of 1's in 25-32 values of the 32-value vector of the HCR of the connected component represent location of horizontal cuts lying in the right zone of the connected component.

Figure 5A:
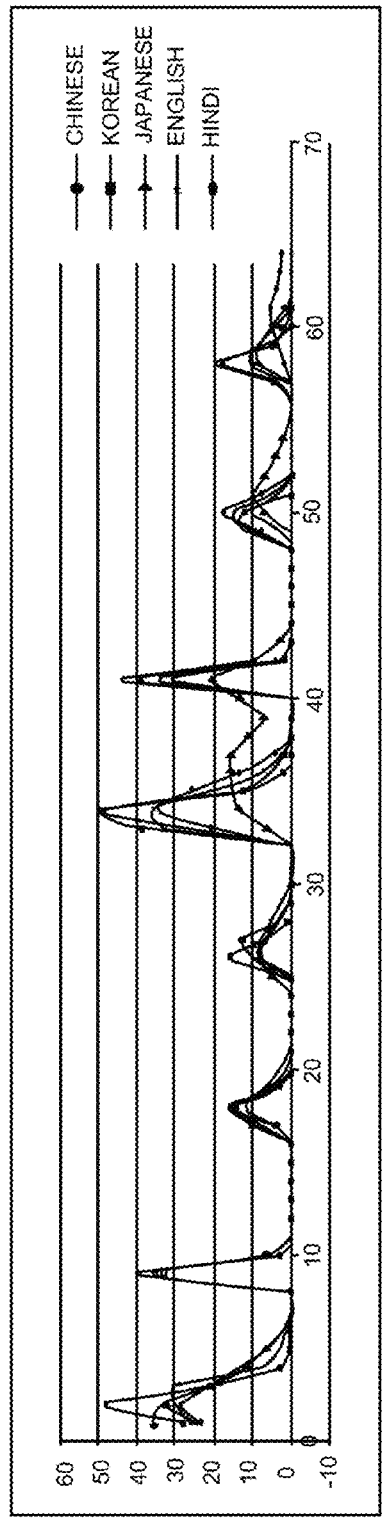
FIGS. 5A-B are example graphical representations of pre-generated reference templates of various scripts and orientations of the images obtained using an associated average concatenated 64-value VDV and HDV, such as those shown in FIGS. 3 and 4, for various scripts and up-down orientations.

Referring now to FIG. 5A, an example graphical representation 500A illustrates pre-generated reference templates of various scripts in the images obtained using an associated average concatenated 64-value VDV and HDV, such as those shown in FIGS. 3 and 4, for various scripts. As shown in the graphical representation 500A, the x-axis indicates the index position of 64 values and the y-axis indicates average distribution of the VCR. In this example, the average distribution of VCR is multiplied by 100. Further, the various scripts include Chinese, Korean, Japanese, English, and Hindi.

In one example implementation, the reference VDV and HDV for each script are generated by averaging the VDVs and HDVs obtained from a plurality of images associated with each script. Further, the obtained reference VDV and HDV are used in obtaining the substantially matching script of the image. This is explained in more detail with reference to FIG. 1.

Figure 5B:
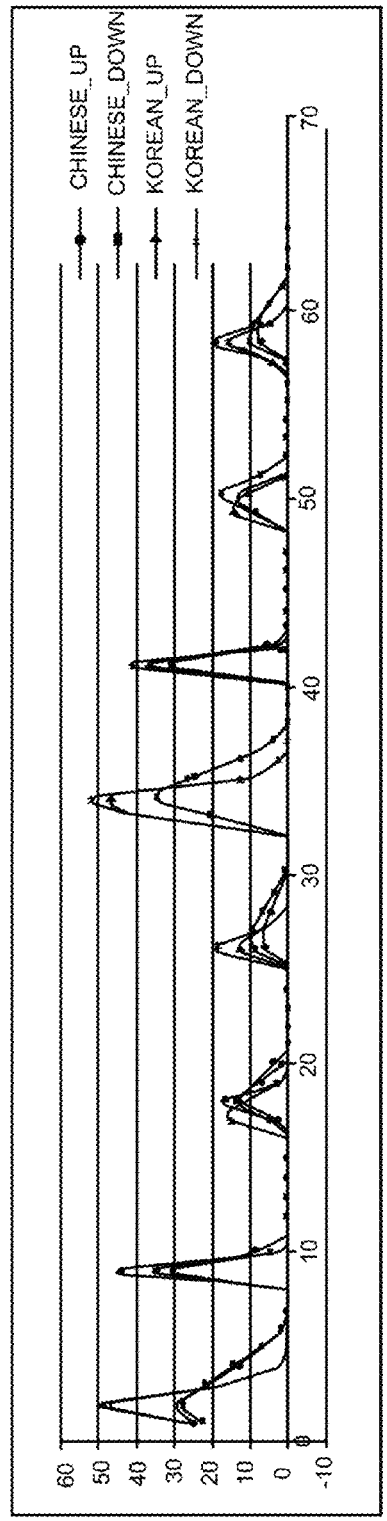

Referring now to FIG. 5B, an example graphical representation 500B illustrates pre-generated reference templates of various scripts and orientations in the image obtained using the associated average concatenated 64-value VDV and HDV, such as those shown in FIGS. 3 and 4, for various scripts and orientations. As shown in the graphical representation 500B, the x-axis indicates index position of 64 values and the y-axis indicates average distribution of the HCR. In this example, the average distribution of HCR is multiplied by 100. Further, the various scripts include Chinese and Korean. Furthermore, various orientations include up and down orientations.

In one example implementation, the reference VDV and HDV for each script and orientation are generated by averaging the VDVs and HDVs obtained from the plurality of images associated with each script and orientation. Further, the obtained reference VDV and HDV are used in obtaining the substantially matching script and orientation of the image. This is explained in more detail with reference to FIG. 1.

Figure 6:
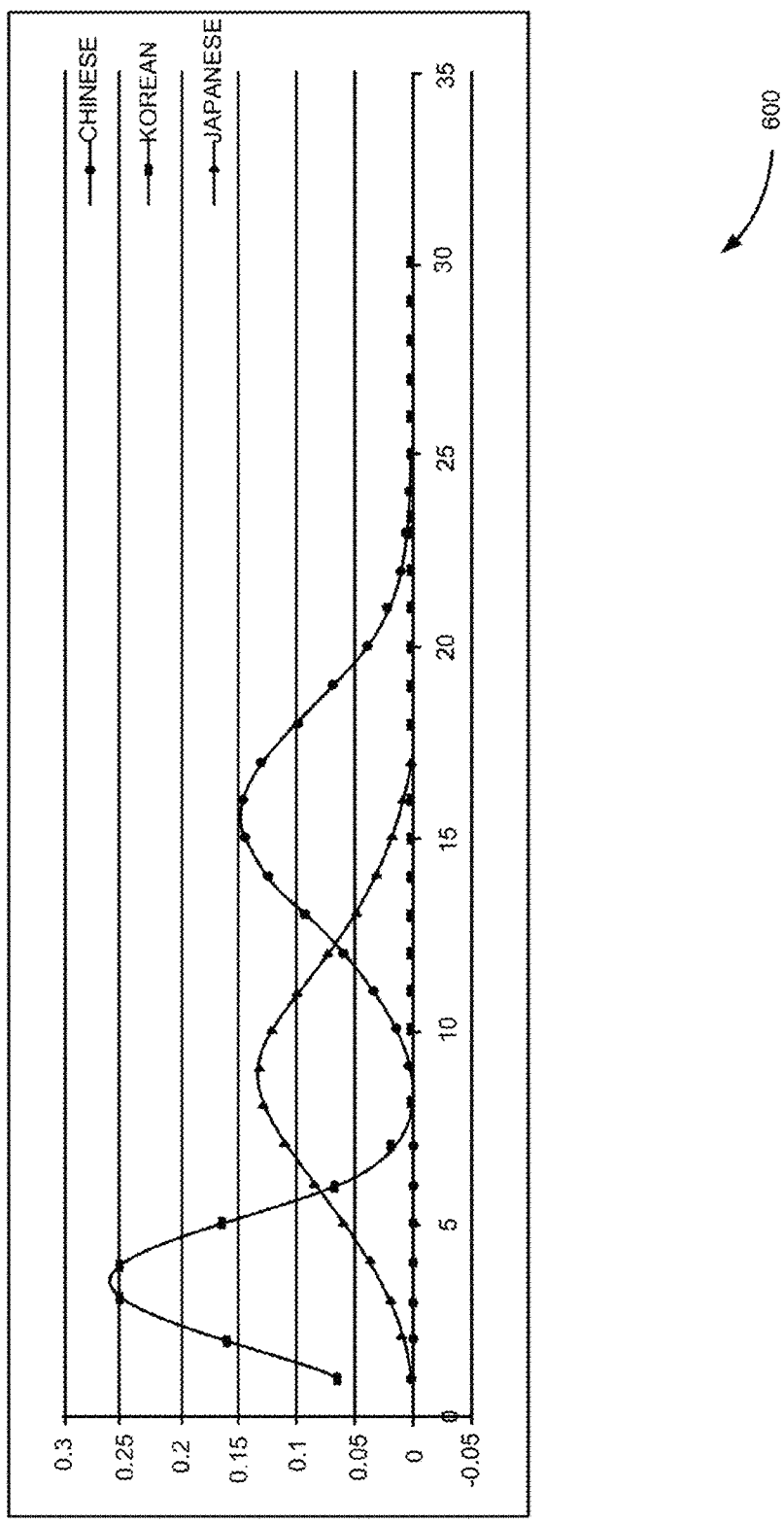
FIG. 6 illustrates an example graph of Gaussian distribution of values at $4^{th}$ index of the average concatenated 64-value VDV and HDV associated with various scripts used in a statistical script identification.

Referring now to FIG. 6, an example graph 600 illustrates Gaussian distribution of values at $4^{th}$ index of the average concatenated 64-value VDV and HDV associated with various scripts used in statistical script identification. The Gaussian distribution is obtained from the statistics generated by about 100 documents of each script and orientation. As shown in graph 600, the x-axis indicates the values at $4^{th}$ index and the y-axis indicates probability density function of the values at 4th index. Further as shown in graph 600, the values at $4^{th}$ index having well separated statistical distributions is the reliable and distinguishing feature for Chinese, Korean, and Japanese scripts.

In one example implementation, a statistical model is constructed to identify the reliable index value out of the 64 index values as the feature of the associated script using the statistics of all the 64 index values. The statistics include mean and standard deviation generated using about 100 documents of each script and orientation. Further, the Gaussian distribution of the values at reliable index of reference 64-value vector associated with various scripts is used in the statistical script identification. The statistical script identification is used to determine deviation of the computed VDV and HDV with the reference VDV and HDV and to correctly detect the script of the image.

Figure 7B:
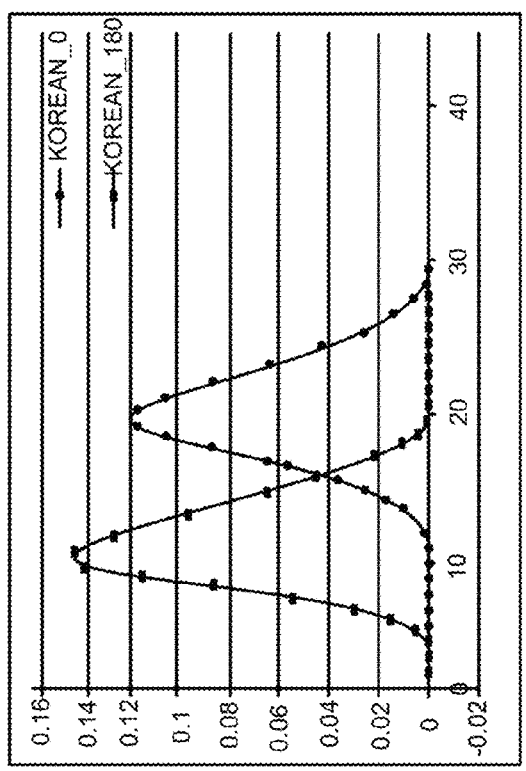
FIGS. 7A-B illustrate example graphs of Gaussian distribution of values at $10^{th}$ index of the average concatenated 64-value VDV and HDV associated with 0 and 180 degree orientations of Chinese script and Gaussian distribution of values at $18^{th}$ index of the average concatenated 64-value VDV and HDV associated with 0 and 180 degree orientations of Korean script, respectively, used in a statistical orientation identification.
Figure 7A:
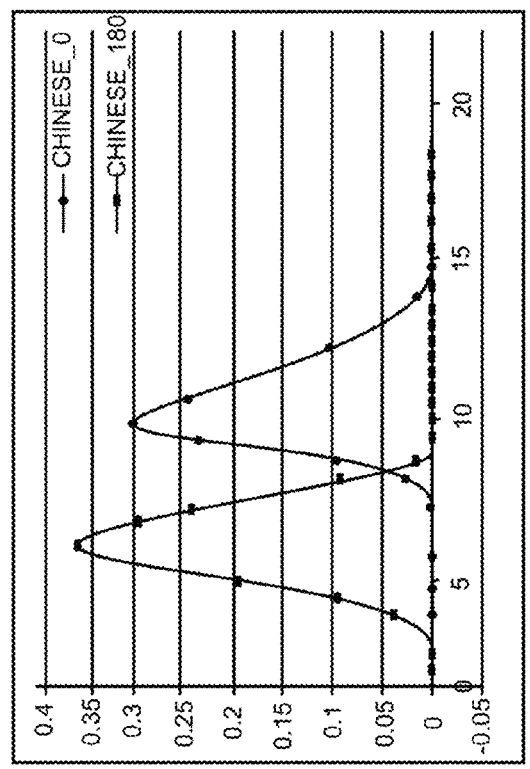

Referring now to FIG. 7A, an example graph 700A illustrates Gaussian distribution of values at $10^{th}$ index of the average concatenated 64-value VDV and HDV associated with 0 and 180 degree orientations of Chinese script. The Gaussian distribution is obtained from the statistics generated by about 100 documents of each script and orientation. As shown in graph 700A, the x-axis indicates the values at $10^{th}$ index and the y-axis indicates probability density function of the values at $10^{th}$ index for the 0 and 180 degree orientations of Chinese script. Further as shown in the graph 700A, it can be seen that the 10th index value for Chinese script having well separated statistical distributions is the reliable and distinguishing feature for the 0 and 180 degree orientations.

In one example implementation, the statistical model is constructed to identify the reliable index out of the 64 values as the feature of the particular orientation of a script. Further, the Gaussian distribution of values at the reliable index (i.e., $10^{th}$ index) of the reference 64-value vector associated with the 0 and 180 degree orientations of Chinese script is used in the statistical orientation identification. The statistical orientation identification is used to determine a deviation of the computed VDV and HDV with the reference VDV and HDV and to correctly detect the orientation of the image.

Referring now to FIG. 7B, an example graph 700B illustrates Gaussian distribution of values at $18^{th}$ index of the average concatenated 64-value VDV and HDV associated with 0 and 180 degree orientations of Korean script. The Gaussian distribution is obtained from the statistics generated by about 100 documents of each script and orientation. As shown in the graph 700B, the x-axis indicates the values at $18^{th}$ index and the y-axis indicates probability density function of the values at $18^{th}$ index for the 0 and 180 degree orientations of Korean script. Further as shown in the graph 700B, it can be seen that the 18th index value for Korean script having well separated statistical distributions is the reliable and distinguishing feature for the 0 and 180 degree orientations.

In one example implementation, the statistical model is constructed to identify the reliable index out of the 64 values as the feature of the particular orientation of a script. Further, the Gaussian distribution of values at the reliable index (i.e., $18^{th}$ index) of the reference 64-value vector associated with the 0 and 180 degree orientations of Korean script is used in the statistical orientation identification. The statistical orientation identification is used to determine deviation of the VDV and HDV with the reference VDV and HDV and to correctly detect the orientation of the image.

Figure 8:
FIG. 8 is an exemplary table illustrating experimental results as obtained, using the method of FIG. 1, for various images.

Referring now to FIG. 8, an exemplary table 800 illustrates experimental results as obtained, using the method of FIG. 1, for various images. Particularly, the exemplary table 800 shows the experimental results for the detection of script and the detection of orientations with given script information. Further, the exemplary table 800 shows accuracy rate of conducted regression runs for various scripts and various orientations when script is given as an input. It can be seen from this table that the overall script detection accuracy rate obtained using the above described method is about 95%. Further, the overall accuracy rate of orientation detection is about 94% with given script information.

As shown in the exemplary table 800, the first row shows the various scripts, such as Chinese, Korean, Japanese, Hindi, and English. Further, the second row shows the number of images of various scripts used for the detection of script and orientations. Furthermore, the third row shows the accuracy rate of the detection of scripts. Also, the fourth row shows the accuracy rate of the detection of orientations with given script information.

Figure 9:
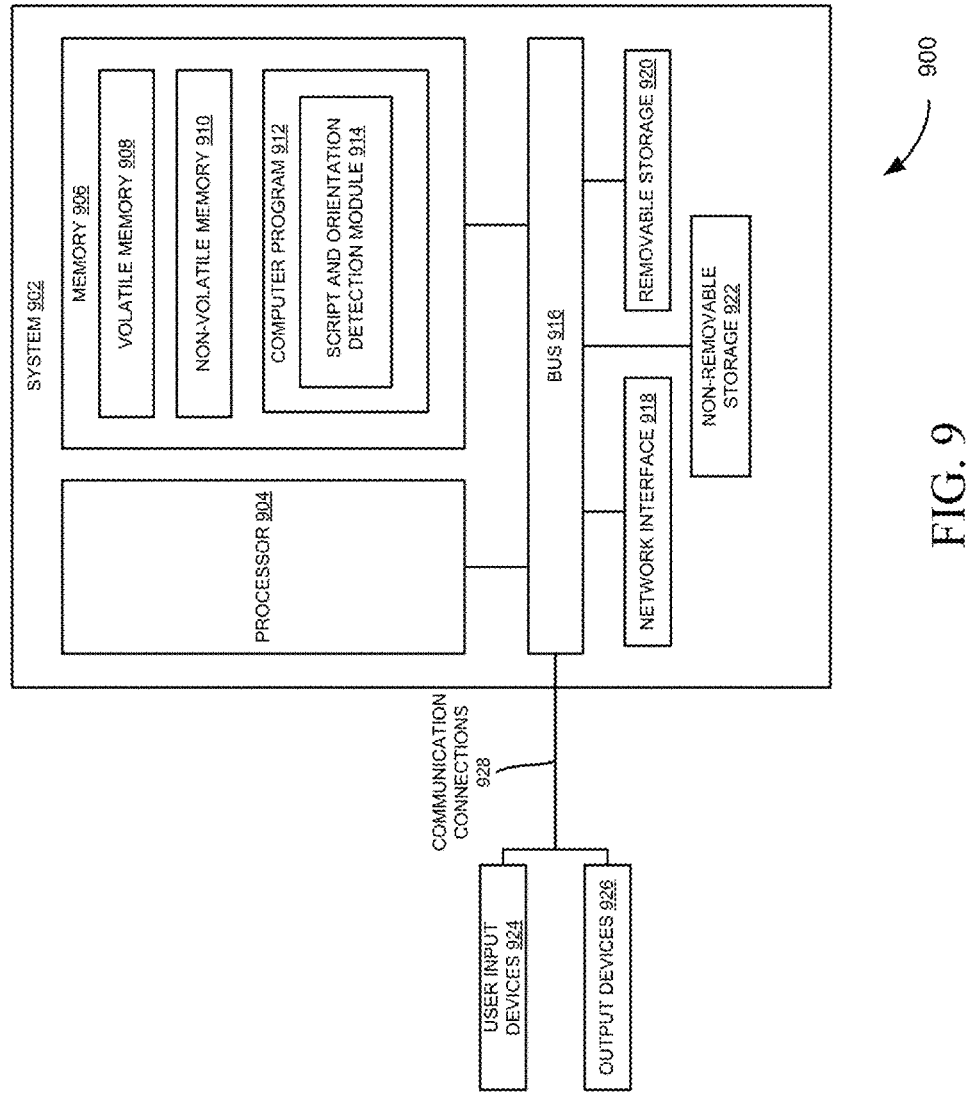
FIG. 9 is an example system including a script and orientation detection module for script and orientation detection of the images, using the method of FIG. 1.

Referring now to FIG. 9, which illustrates an example system 902 including a script and orientation detection module 914 for detecting script and orientation of images using the process shown in FIG. 1. FIG. 9 and the following discussions are intended to provide a brief, general description of a suitable computing environment in which certain examples of the inventive concepts contained herein are implemented.

The system 902 includes a processor 904, memory 906, a removable storage 920, and a non-removable storage 922. The system 902 additionally includes a bus 916 and a network interface 918. As shown in FIG. 9, the system 902 includes access to the computing system environment 900 that includes one or more user input devices 924, one or more output devices 926, and one or more communication connections 928 such as a network interface card and/or a universal serial bus connection.

Exemplary user input devices 924 include a digitizer screen, a stylus, a trackball, a keyboard, a keypad, a mouse and the like. Exemplary output devices 926 include a display unit of the personal computer, a mobile device, and the like. Exemplary communication connections 928 include a local area network, a wide area network, and/or other network.

The memory 906 further includes volatile memory 908 and non-volatile memory 910. A variety of computer-readable storage media are stored in and accessed from the memory elements of the system 902, such as the volatile memory 908 and the non-volatile memory 910, the removable storage 920 and the non-removable storage 922. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 904, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 904 also includes embedded controllers, such as generic or programmable logic devices or arrays, application specific integrated circuits, single-chip computers, smart cards, and the like.

Examples of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 904 of the system 902. For example, a computer program 912 includes machine-readable instructions capable of detecting script and orientation of images in the system 902, according to the teachings and herein described examples of the present subject matter. In one example, the computer program 912 is included on a compact disk-read only memory (CD-ROM) and loaded from the CD-ROM to a hard drive in the non-volatile memory 910. The machine-readable instructions cause the system 902 to encode according to the various examples of the present subject matter.

As shown in FIG. 9, the computer program 912 includes the script and orientation detection module 914. For example, the script and orientation detection module 914 can be in the form of instructions stored on a non-transitory computer-readable storage medium. The non-transitory computer-readable storage medium having the instructions that, when executed by the system 902, causes the system 902 to perform the method described in FIG. 1.

The script and orientation detection module 914 extracts textual content in the image. In one example implementation, the script and orientation detection module 914 obtains the gray level/colored image by capturing the image using the camera or scanner. Further, the script and orientation detection module 914 obtains the binarized image from the gray level/colored image. Furthermore, the script and orientation detection module 914 dilates the binarized image to join disjoint parts of characters in the binarized image. In addition, the script and orientation detection module 914 identifies and extracts the textual content by performing a connected component analysis and a resolution based thresholding on the dilated image.

Further, the script and orientation detection module 914 obtains the VCR and the HCR by vectorizing each connected component in the extracted textual content in the image. Furthermore, the script and orientation detection module 914 computes a concatenated VDV and HDV by averaging the obtained VCR and HCR for each connected component in the image. In addition, the script and orientation detection module 914 obtains a substantially matching script and orientation by comparing the computed concatenated VDV and HDV of the image with reference VDV and HDV associated with each script and orientation, respectively. Also, the script and orientation detection module 914 determines whether the computed concatenated VDV and HDV of the image substantially matches with the reference VDV and HDV of the matching script and orientation, respectively. Moreover, the script and orientation detection module 914 declares the matching script and orientation as the script and orientation of the image, when the computed concatenated VDV and HDV of the image substantially matches with the reference VDV and HDV of the matching script and orientation, respectively.

In various examples, the system and method described in FIGS. 1 through 9 enable the detection of script and orientation of the images with increased accuracy and less complexity. Further, the dilation is performed on the binarized image to join disjoint parts of the characters in the binarized image. Thus, the accuracy of detection of script and orientation is improved, especially for Asian languages. Furthermore, the script and orientation of the image are identified by capturing the uniqueness in the pattern of strokes in the characters, to cleanly extract the textual content. Thus, various distortions in the image are discarded. In addition, the use of HDV significantly improves the detection accuracy. Also, the use of SSD significantly increases the detection accuracy as the difference between the computed concatenated VDV and HDV of the input image and the reference VDV and HDV of various script and orientations are more pronounced due to squaring. Further, statistical script identification and statistical orientation identification are used to refine the detection process. Hence, the robustness of the proposed method is improved.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for script and orientation detection of an image, comprising:
   extracting textual content in the image;
   obtaining a vertical component run (VCR) and a horizontal component run (HCR) by vectorizing each connected component in the extracted textual content in the image;

computing a concatenated vertical document vector (VDV) and horizontal document vector (HDV) by averaging the obtained VCR and HCR for each connected component in the image;
obtaining a substantially matching script and orientation by comparing the computed concatenated VDV and HDV of the image with each of a plurality of reference VDVs and HDVs, wherein each reference VDV and HDV is associated with a script and an orientation of a plurality of scripts and orientations;
determining whether the computed concatenated VDV and HDV of the image substantially match with the reference VDV and HDV associated with the matching script and orientation; and
if the computed concatenated VDV and HDV of the image substantially match with the reference VDV and HDV associated with the matching script and orientation, then declaring the matching script and orientation as the script and orientation of the image.

2. The method of claim 1, wherein the image comprises a captured/scanned image.

3. The method of claim 1, wherein extracting the textual content from the image comprises:
obtaining a gray level/colored image by capturing the image using a camera or scanner;
obtaining a binarized image from the gray level/colored image;
dilating the binarized image to join disjoint parts of characters in the binarized image; and
identifying and extracting the textual content by performing a connected component analysis and a resolution based thresholding on the dilated image.

4. The method of claim 1, further comprising:
generating the reference VDV and HDV for each script and orientation by averaging the VDVs and HDVs obtained from a plurality of images, each of the plurality of images being associated with a script and an orientation.

5. The method of claim 1, wherein obtaining the substantially matching script and orientation comprises:
computing sums of squared differences (SSDs) between the computed VDV and HDV and each of the reference VDVs and HDVs.

6. The method of claim 5, further comprising:
obtaining a minimum SSD from the computed SSDs; and
obtaining the substantially matching script and orientation associated with the obtained minimum SSD, wherein the obtained minimum SSD is less than or equal to a first threshold value.

7. The method of claim 6, further comprising:
computing orientation SSDs between the computed VDV and HDV and each of a set of reference VDVs and HDVs, each reference VDV and HDV being associated with an orientation of a plurality of orientations;
determining whether any one of the computed orientation SSDs is equal to or below a second threshold value; and
if any one of the computed orientation SSDs is equal to or below the second threshold value, declaring the orientation associated with computed SSD that is equal to or below the second threshold value as the orientation of the image.

8. The method of claim 7, further comprising:
if none of the computed orientation SSDs is equal to or below the second threshold value, then performing a statistical orientation identification to identify the orientation of the image.

9. The method of claim 7, wherein the plurality of orientations comprise image orientation angles selected from the group consisting of 0 degree, 90 degree, 180 degree, and 270 degree.

10. The method of claim 1, further comprising:
if the computed concatenated VDV and HDV of the image does not substantially match with the reference VDV and HDV of the matching script and orientation, then performing a statistical script identification to identify the script of the image.

11. A non-transitory computer-readable storage medium for script and orientation detection of images having instructions that when executed by a computing device, cause the computing device to:
extract textual content in the image;
obtain a vertical component run (VCR) and a horizontal component run (HCR) by vectorizing each connected component in the extracted textual content in the image;
compute a concatenated vertical document vector (VDV) and horizontal document vector (HDV) by averaging the obtained VCR and HCR for each connected component in the image;
obtain a substantially matching script and orientation by comparing the computed concatenated VDV and HDV of the image with each of a set of reference VDV and HDV, wherein each reference VDV and HDV is associated with a script and an orientation of a plurality of scripts and orientations;
determine whether the computed concatenated VDV and HDV of the image substantially match with the reference VDV and HDV associated with the matching script and orientation; and
if the computed concatenated VDV and HDV of the image substantially match with the reference VDV and HDV associated with the matching script and orientation, then declaring the matching script and orientation as the script and orientation of the image.

12. The method of claim 11, wherein the image comprises a captured/scanned image.

13. The non-transitory computer-readable storage medium of claim 11, wherein extracting the textual content from the image comprises:
obtaining a gray level/colored image by capturing the image using a camera or scanner;
obtaining a binarized image from the gray level/colored image;
dilating the binarized image to join disjoint parts of characters in the binarized image; and
identifying and extracting the textual content by performing a connected component analysis and a resolution based thresholding on the dilated image.

14. A system for script and orientation detection of images, comprising:
a processor;
a memory coupled to the processor; and
a script and orientation detection module residing in the memory,
wherein the script and orientation detection module extracts textual content in the image,
wherein the script and orientation detection module obtains a vertical component run (VCR) and a horizontal component run (HCR) by vectorizing each connected component in the extracted textual content in the image,
wherein the script and orientation detection module computes a concatenated vertical document vector (VDV)

and horizontal document vector (HDV) by averaging the obtained VCR and HCR for each connected component in the image, wherein the script and orientation detection module obtains a substantially matching script and orientation by comparing the computed concatenated VDV and HDV of the image with each of a plurality of reference VDVs and HDVs, wherein each reference VDV and HDV is associated with a script and an orientation of a plurality of scripts and orientations, wherein the script and orientation detection module determines whether the computed concatenated VDV and HDV of the image substantially match with the reference VDV and HDV associated with the matching script and orientation, and wherein the script and orientation detection module declares the matching script and orientation as the script and orientation of the image, when the computed concatenated VDV and HDV of the image substantially match with the reference VDV and HDV associated with the matching script and orientation.

15. The system of claim 14, wherein script and orientation detection module obtains a gray level/colored image by capturing the image using a camera or scanner, wherein the script and orientation detection module obtains a binarized image from the gray level/colored image, wherein the script and orientation detection module dilating the binarized image to join disjoint parts of characters in the binarized image, and wherein the script and orientation detection module identifies and extracts the textual content by performing a connected component analysis and a resolution based thresholding on the dilated image.

* * * * *

UNITED STATES PATENT AND TRADEMARK OFFICE
CERTIFICATE OF CORRECTION

| | |
|---|---|
| PATENT NO. | : 8,903,175 B2 |
| APPLICATION NO. | : 13/219751 |
| DATED | : December 2, 2014 |
| INVENTOR(S) | : Chirag Jain et al. |

It is certified that error appears in the above-identified patent and that said Letters Patent is hereby corrected as shown below:

In the Claims

In column 10, line 40, in Claim 12, delete "method" and insert -- non-transitory computer-readable storage medium --, therefor.

Signed and Sealed this
Sixteenth Day of June, 2015

Michelle K. Lee
*Director of the United States Patent and Trademark Office*